Aug. 10, 1954  G. W. SCHATZMAN  2,686,062
FENDER AND FENDER SHIELD ASSEMBLY
Filed April 26, 1950  2 Sheets-Sheet 1
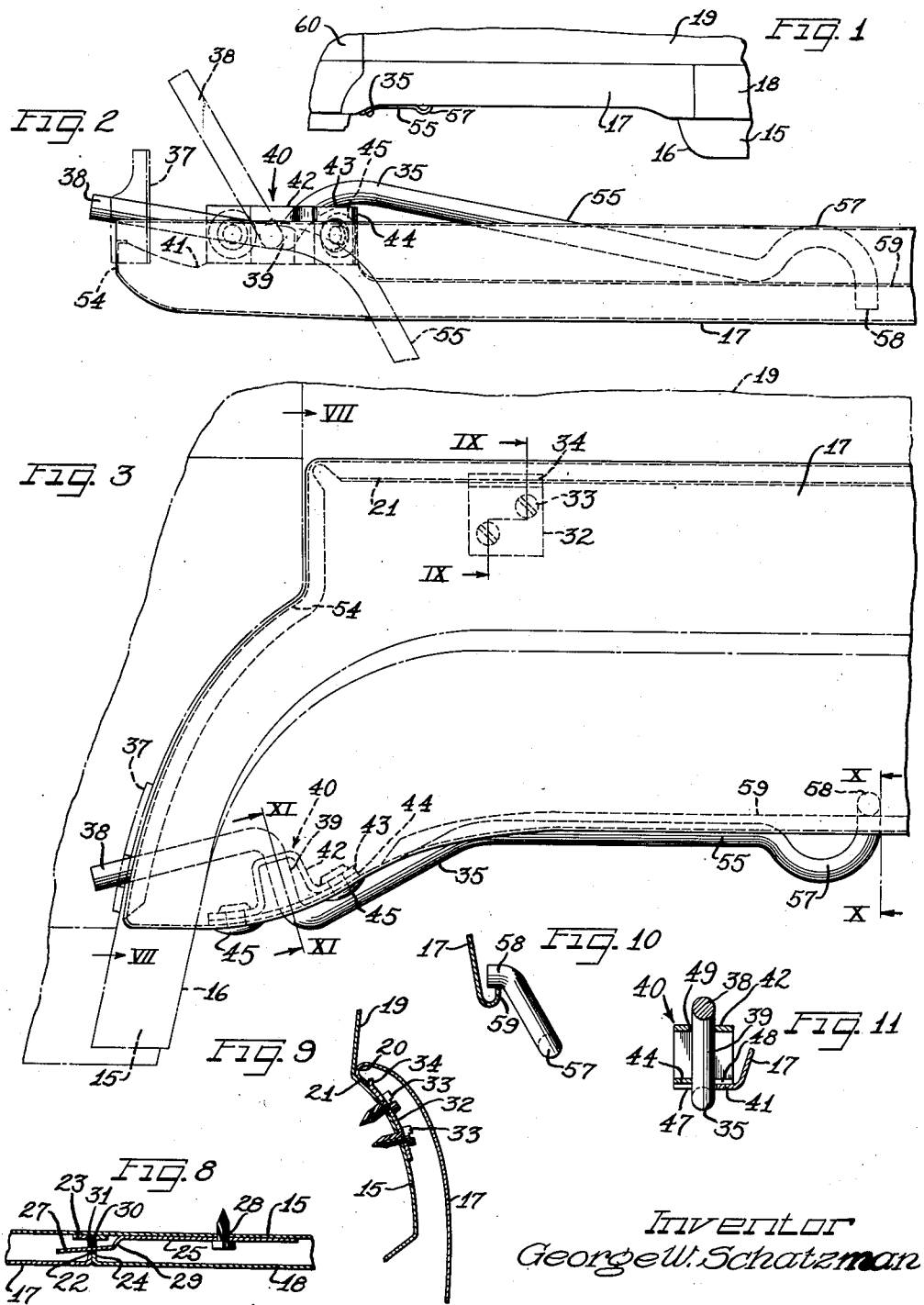
Inventor
George W. Schatzman
By The firm of Charles W. Hills Attys

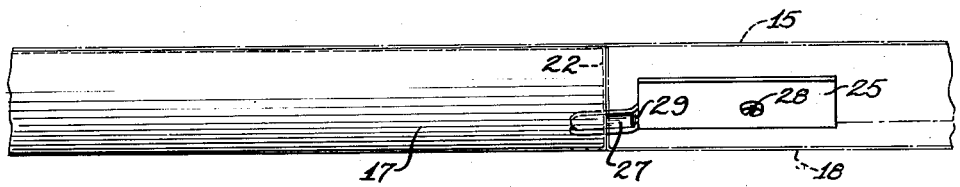
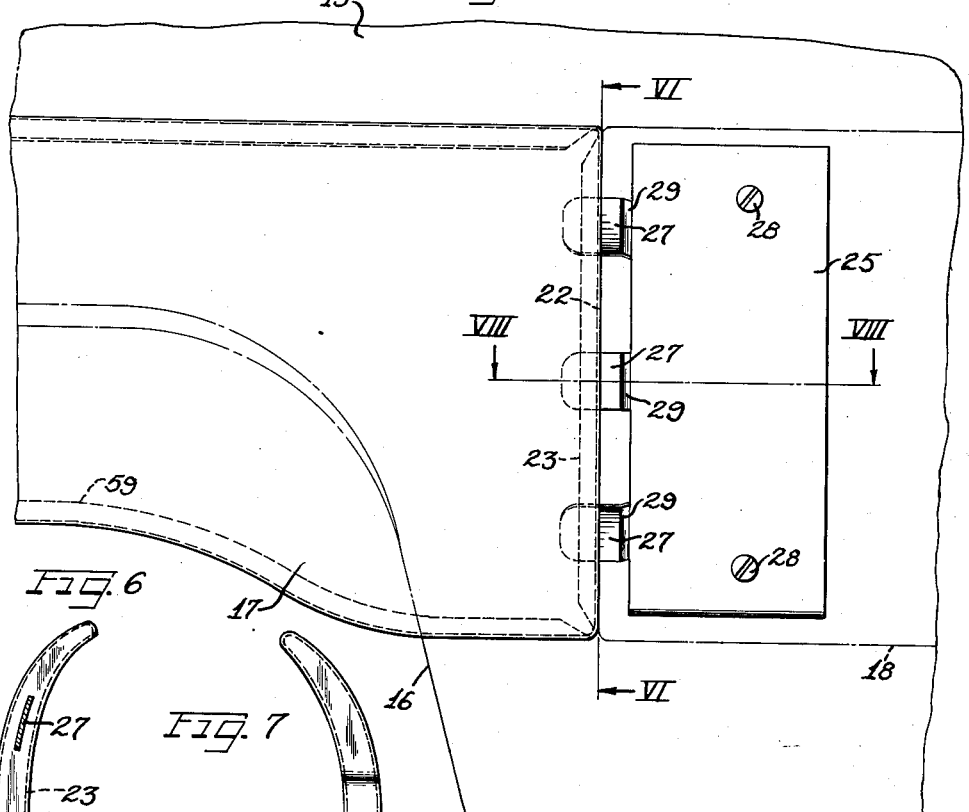
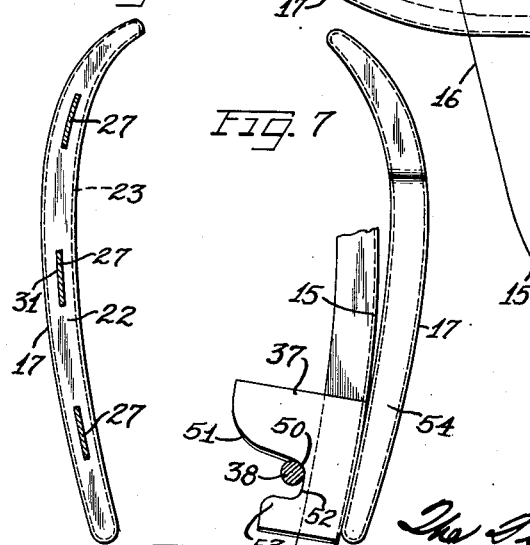

Patented Aug. 10, 1954

2,686,062

UNITED STATES PATENT OFFICE 2,686,062

FENDER AND FENDER SHIELD ASSEMBLY

George W. Schatzman, Detroit, Mich., assignor to Houdaille-Hershey Corporation, Detroit, Mich., a corporation of Michigan Application April 26, 1950, Serial No. 158,257

10 Claims. (Cl. 280—153)

The present invention relates to improvements in fender and fender skirt or shield assemblies, and more particularly concerns a novel arrangement whereby the fender shield comprises part of a rub rail on the fender.

In the vehicle industry, and particularly in the automobile branch thereof, various means have been utilized to improve the appearance of vehicle fenders. The usual vehicle fender is provided with an opening affording access to the vehicle wheel, and permitting ready removal or replacement of the wheel in an axial direction. Since this opening inherently presents an unattractive outward appearance, and in high speed operation is an air turbulence factor, detachable fender shields have been employed to cover the opening protectively and ornamentally.

As the term "fender shield" shall hereinafter be employed, it refers to any member which is adapted to be secured to a fender or other portion of a vehicle body for the purpose of substantially covering the opening in the fender or vehicle body and which opening is provided for access to or removal of a vehicle wheel.

Furthermore, as the term "fender" shall hereinafter be employed, it refers to any form of wheel housing or fender in its broad sense, whether such fender be separable from the vehicle body part, partly separable from the vehicle body part, or actually an integral part of the vehicle body, and whether or not it projects outwardly from the principal body portion of the vehicle.

An important object of the present invention is to provide a novel fender and fender shield assembly in which the fender shield is secured to the fender in a novel manner.

Another object of the invention is to provide a fender shield and novel means for attaching the same to a fender.

A further object of the invention is to provide novel structure for detachably securing a fender shield to a fender.

Still another object of the invention is to provide an improved fender shield arrangement which will serve as a part of a rub rail assembly on a fender.

Yet another object of the invention is to provide improved means for aligning and supporting a fender shield in association with a rub rail on a fender.

Other objects, features and advantages of the present invention will be readily apparent from the following detailed description of a preferred embodiment taken in conjunction with the accompanying drawings, in which:

Figure 1 is a fragmentary side elevational view of a fender and fender shield assembly embodying the features of the present invention;

Figure 2 is an enlarged fragmentary top plan view of the forward end portion of the fender shield;

Figure 3 is a side elevational view of the forward end portion of the fender shield;

Figure 4 is a fragmentary top plan view of the rear end portion of the fender shield;

Figure 5 is a side elevational view of the rear end portion of the fender shield;

Figure 6 is a vertical sectional view taken substantially on the line VI—VI of Figure 5;

Figure 7 is an end elevational view partly in section taken substantially on the line VII—VII of Figure 3;

Figure 8 is a fragmentary sectional detail view taken substantially on the line VIII—VIII of Figure 5;

Figure 9 is a fragmentary vertical sectional detail view taken substantially on the line IX—IX of Figure 3;

Figure 10 is a fragmentary vertical sectional detail view taken substantially on the line X—X of Figure 3; and Figure 11 is a sectional detail view taken substantially on the line XI—XI of Figure 3.

An assembly embodying the features of the present invention comprises, as shown in Figure 1, a fender 15 having a wheel access opening 16 closed by a fender shield 17. Herein the fender shield 17 comprises a relatively elongated panel which is of a width complementary to and cooperating with a rub rail 18 carried by the rear end portion of the fender 15. Thus, the fender shield in addition to its wheel access opening closure function also functions as a part of the rub rail assembly, serving as a forward continuation of the rub rail 18.

The rub rail 18 may be made of any suitable material and in any suitable fashion and is attached to the fender 15 in any preferred manner, replaceably if desired.

The fender shield 17 is formed from suitable sheet material which may either be plated or polished or otherwise finished to match the finish on the exterior of the rub rail 18. In an economical structure, the fender shield comprises a single sheet of the material such as sheet metal appropriately contoured, in the present instance of more or less curved form in vertical section. This contour more or less follows and is complementary to the contour of the fender 15 which, as best seen in Figure 9, bulges out from juncture with the body of the vehicle identified at 19.

The upper margin of the fender shield is formed to extend generally inwardly and has a rounded marginal rib 20 adapted to fit within the reentrant corner defined between the fender 15 and the body 19. Extending from the marginal reinforcing rib 20 is an underturned flange 21 which in assembly of the fender shield with the fender rests against the fender.

At its rear end, the fender shield 17 is formed with an end marginal inturned flange 22 (Figures 4, 5, 6 and 8) from the inner edge of which extends a terminal flange 23 turned under the fender shield and contoured to lie flush against the fender 15. In assembly the rear end flange 22 of the fender shield butts against a corresponding forward end flange 24 on the rub rail 18. Thereby the fender shield and the rub rail lie flush and form a substantially continuous rail assembly.

Novel means are provided for maintaining the fender shield 17 in alignment with the rub rail 18 and also for supporting the rear end portion of the fender shield on the fender. To this end a bracket 25 which may be formed from sheet metal as a simple plate is mounted inside the rub rail 18 on the fender 15 and has means in the form of a plurality of tongues or fingers 27 which bridge the joint between the ends of the rub rail and the fender shield to provide an aligning and supporting connection for the fender shield. The bracket panel 25 may be secured to the fender in any preferred fashion as for example by means of sheet metal drive screws 28.

Each of the aligning and supporting fingers 27, of which there may be three as shown in Figures 5 and 6 is offset outwardly from the plane of the bracket panel 25 by means of an offsetting kink or bend 29 to a sufficient extent to extend through aligned slots 30 and 31 formed respectively in the rub rail end flange 24 and fender shield end flange 22. Through this arrangement the retaining fingers 27 extend beyond the rub rail end flange 24 and in applying the fender shield to the fender, the fender shield is moved endwise toward the fingers 27 and the fingers received through the end flange slots 31. In order to facilitate mounting of the fender shield with respect to the retaining fingers 27, the latter are preferably angled outwardly as best seen in Figure 8. This makes it relatively easy to register the tips of the fingers in the slots 31 and then as the fender shield is moved endwise into abutment with the adjacent end of the rub rail 18, the fingers 27 tend to draw the fender shield inwardly toward the fender.

By having each of the retaining fingers 27 extend through an individual aperture 30 in the end flange of the rub rail, substantial shear support for the individual retaining and alignment fingers is provided so as to withstand the weight of the supported end of the fender shield under jarring impacts of the vehicle in service.

Following attachment of the rear end of the fender shield 17 in position on the fender, the opposite or front end portion of the fender shield is attached. This is accomplished in two steps. The first step comprises hooking the underturned upper marginal flange 21 of the fender shield onto an upper supporting bracket 32 (Figures 3 and 9). In a simple inexpensive form the bracket 32 comprises a sheet metal plate which is secured, as by means of sheet metal drive screws 33, to the outer face of the upper portion of the fender 15 adjacent the juncture with the body 19 and above the forward portion of the wheel access opening 16.

The location of the supporting bracket 32 is such that an upper marginal flaring lip-like flange 34 on the bracket is disposed to receive the edge of the fender shield flange 21 retainingly and with the turned bead-like reinforcing edge 20 of the fender shield seated in the reentrant groove defined between the fender 15 and the body 19. By having the retaining flange 34 disposed at an acute angle to the adjacent surface of the fender 15, the edge of the flange 21 is drawn in close to the surface of the fender 15 so that the flange 21 closely hugs the fender.

The second step in attaching the forward end of the fender shield 17 comprises latching the fender shield against unintentional displacement. For this purpose a rod latch 35 is provided at the lower forward end portion of the fender shield for engagement with a latching bracket 37 on the adjacent lower portion of the fender (Figures 2, 3 and 7).

In an inexpensive and efficient form, the latch 35 comprises a one-piece rod member which may be formed from suitable heavy gauge wire stock. Throughout the major extent of its length, the latch member 35 comprises a handle portion which in latching position is directed rearwardly. The forward portion of the latching member comprises a latching arm 38 which is joined with the handle portion of the latch by an angular offsetting journal portion 39 (Figures 2, 3 and 11). A pivot bearing for the journal portion 39 is provided by a bearing bracket 40 which is mounted on an inturned lower marginal flange 41 on the fender shield 17.

In a preferred construction, the bearing bracket 40 comprises an inverted U-shaped sheet metal member 42 having oppositely extending terminal flanges 43 on the lower portions of the legs thereof secured to a base plate 44. The flanges 43 and the base plate 44 may be secured together and to the fender shield flange 41 by means such as rivets 45. Through this arrangement the lower bearing for the journal portion 39 is provided by the fender shield flange 41 and the bracket base plate 44, the flange 41 having an inwardly opening bearing slot 47 while the base plate 44 has an outwardly opening complementary bearing slot 48. In the assembly the edge defining the slots 47 and 48 cooperate to encircle the journal portion 39. A bearing aperture 49 in the web or crown portion of the bracket member 42 bearingly accommodates the upper part of the journal portion 39. It will be observed that this arrangement facilitates assembly of the latch member 35 with the bearing bracket 40 since the latching arm 38 can be threaded through the bearing aperture 49 and the journal portion 39 then assembled into the bearing slot 48 and finally into the flange bearing slot 47 and the bearing bracket assembly then secured to the flange 41.

As best seen in Figure 3 the bearing bracket 40 is preferably secured on a downwardly and forwardly tilted portion of the fender shield flange 41 so that the axis of rotation of the journal portion 39 of the latching member is tilted forwardly. As a result, the latching arm 38 extends forwardly and downwardly so that the tip portion thereof is as close as practicable to the lower front corner of the fender shield. Hence, when the latch member is pivoted or swung to carry the latching arm 38 from the non-latching position, as indicated in dot-dash outline in Figure 2, to the full latching position shown in Figures 3 and 7, a firm attachment of the lower front portion of the fender shield is effected as a result of interengagement of the latching arm 38 with a recessed latching shoulder 50 on the latching bracket 37.

The latching bracket 37 may comprise a sheet metal plate which is appropriately secured to the fender 15 adjacent to the forward end margin defining the wheel access opening 16 and with the plate projecting inwardly so that the latch arm engaging shoulder 50 also faces inwardly.

In order to effect not only inward drawing of the fender shield but also a component of downward pressure to draw the fender shield snugly against the fender in cooperation with the upper supporting bracket 32, the latching shoulder 50 is preferably formed as the lowermost portion of a downwardly and outwardly directed cam surface of generally ogee curvature merging with an inwardly facing recess edge 52 extending downwardly beyond the shoulder 50. As a safety measure against the unlikely failure of the upper supporting bracket 32 and liability to dropping of the forward end portion of the fender shield, an inwardly projecting ear 53 underlies the shoulder 50 in spaced relation to provide a rest for the latch arm 38. In the full latching position, the latch arm 38 projects at an angle forwardly and inwardly to clear the adjacent margin of the fender and a forward end reinforcing flange structure 54 on the fender shield.

From the journal portion 39, the major handle portion of the latch member 35 extends inwardly and rearwardly, as well as upwardly, clear of the bearing bracket 40 and the adjacent portion of the fender shield flange 41, and then angles rearwardly in a stretch 55 which is also preferably angled somewhat outwardly to a downwardly extending finger loop 57 terminating in an outwardly directed locking finger 58 retainingly engageable upon an upturned flange portion 59 at the inside of the lower margin of the fender shield (Figures 3 and 10). Thus, while in the non-latching condition of the latch 35, the handle portion 55 and the finger loop 57 are adapted to spring down clear of the lower margin of the fender shield, so that the latching member can be swung about its journal portion.

In the full latching position, the handle portion is sprung up to effect engagement of the retaining finger 58 with the lower marginal flange 59 of the fender shield. In effecting this locked condition of the latch, the inherent resiliency of the latch member is utilized to place the entire latch member including the latch arm 38 and the handle portion under stress torsionally about the journal portion 39. In this connection the latching shoulder 50 of the latching bracket 37 is so disposed with respect to the latching arm 38 that full latching engagement with the shoulder 50 is completed before the handle portion of the latch member is fully behind the fender shield so that further inward flexing of the handle portion is necessary to effect the locked condition of the latch. As a result, not only does the latch act to effect resilient tension downwardly and inwardly on the lower front portion of the fender shield, but the handle portion is resiliently tensioned to maintain the locking terminal 58 in interlocked relation with the fender shield flange 59.

The forward end portion of the fender shield 17 may be appropriately contoured as shown to accommodate the adjacent portion of a vehicle door 60.

From the foregoing it will be apparent that not only does the fender shield of the present invention afford a protective and ornamental fender shield covering over a substantial portion of the wheel access opening of the fender, but it also provides a section in a rub rail assembly.

Mounting of the fender shield is very easily effected by moving the rear end portion of the fender shield into the assembled relationship by a rearward endwise movement into engagement with the retaining fingers 27. Then the upper forward portion of the fender shield is hooked onto the retaining bracket 32. Finally the latch 35 which is, of course, up to this point open is swung to latching position wherein the forward portion of the fender shield is placed under downward and inward pressure to hug against the fender, and the latch is locked against unintentional opening. Removal of the fender shield is very easily effected by simply a reversal of the steps just described for mounting the fender shield, namely, releasing the latch 35, lifting the forward end portion of the fender shield from the bracket 32 and then withdrawing the fender shield forwardly from engagement with the retaining fingers 27 and lifting the fender shield away from the fender.

It will be understood that modifications and variations may be effected without departing from the scope of the novel concepts of the present invention.

I claim as my invention:

1. In combination in a fender and fender shield assembly, a fender having a wheel access opening, a rub rail mounted on the fender adjacent to one end of the wheel access opening and terminating short of the wheel access opening, a fender shield mounted on the fender in substantially closing relation to the wheel access opening and having upper marginal and end portions overlapping respectively the upper margin and the end margins of the fender defining the wheel access opening, said fender shield having an end abutting the adjacent end of the rub rail, whereby the fender shield serves as a continuation of the rub rail, and means concealed behind the rub rail for connecting the adjacent end of the fender shield in alignment with the rub rail.

2. In combination in a fender and fender shield assembly, a fender, a rub rail mounted on the fender and having an inwardly extending end flange, said fender having a wheel access opening and said end flange of the rub rail being located adjacent to one end of said opening, a fender shield for substantially closing said access opening and having an end portion opposing the end flange of the rub rail, said fender end portion having an inwardly extending flange, said flanges having registering slots therein, and a bracket mounted behind the rub rail and having a tongue extending through said slots and thereby supporting the adjacent end portion of the fender shield, said tongue extending at an outwardly flaring angle whereby to facilitate assembly of the fender shield by an endwise movement and to draw the end portion of the fender shield toward the fender.

3. In a fender and fender shield assembly, a fender having a wheel access opening, a fender shield for substantially closing said opening, the upper margin of the fender shield having an inwardly and downwardly directed reinforcing flange, a bracket mounted on the fender and having an upper outwardly flaring flange interengaging said fender shield flange and thereby supporting the upper portion of the fender shield on the fender, a latch carried by the lower portion of the fender shield adjacent to the end of the fender shield nearest said bracket and pivotal about a generally upright axis and having an arm swingable about an arc rearwardly of the adjacent end portion of the fender shield and to project endwise relative to the fender shield, and a bracket on the fender projecting rearwardly behind the margin thereof adjacent said end portion of the fender shield and having a downwardly and outwardly sloping cam surface terminating in an inwardly and downwardly facing latching shoulder engageable by said latching arm on swinging of the latter into engagement with the bracket to effect downward and inward drawing of the end portion of the fender shield to effect a secure interhooking relationship of the upper marginal flange of the fender shield and said bracket and hugging of the fender shield against the fender.

4. In combination in a fender and fender shield assembly, a fender having a wheel access opening, a fender shield for substantially closing said opening and having an end portion overlapping a marginal fender portion defining an end of the wheel access opening, a bracket carried by the fender behind said fender margin and projecting inwardly, said bracket having a downwardly and inwardly facing shoulder, and a latch supported movably on the lower margin of the fender shield adjacent to said end and having an arm engageable under tension against said shoulder to draw the fender shield downwardly and inwardly relative to the fender.

5. In combination in a fender and fender shield assembly, a fender having a wheel access opening, a fender shield for substantially closing said opening and having an end portion overlapping a marginal fender portion defining an end of the wheel access opening, a bracket carried by the fender behind said fender margin and projecting inwardly, said bracket having a downwardly and inwardly facing shoulder, and a latch supported movably on the lower margin of the fender shield adjacent to said end and having an arm engageable under tension against said shoulder to draw the fender shield downwardly and inwardly relative to the fender, said bracket having an inwardly projecting ear below said shoulder serving as a safety support for said arm in the event of dropping of the adjacent end portion of the fender shield.

6. In combination in a fender shield assembly, a fender shield panel having a lower inturned margin adjacent to one end, a bearing bracket carried by the upper side of said flange behind the adjacent margin of the fender shield, and a latch member having a journal extending on a generally up and down axis through said bearing bracket and having an arm on the upper portion thereof projecting endwise of the fender shield, said latching member being pivotal about the journal portion to swing said arm for engaging and disengaging the same from a fender bracket with which the arm may engage for latching the fender shield in position on a fender upon which it may be mounted.

7. In combination in a fender shield assembly, a fender shield panel having a lower inturned margin adjacent to one end, a bearing bracket carried by the upper side of said flange behind the adjacent margin of the fender shield, and a latch member having a journal extending on a generally up and down axis through said bearing bracket and having an arm on the upper portion thereof projecting endwise of the fender shield, said latching member being pivotal about the journal portion to swing said arm for engaging and disengaging the same from a fender bracket with which the arm may engage for latching the fender shield in position on a fender upon which it may be mounted, the axis of the journal member being tilted upwardly and toward the end of the fender shield and the latching arm being tilted downwardly and endwise of the fender shield so as to be swung to a point closely adjacent to the extreme lower corner of the fender shield.

8. In a fender shield latching mechanism, a bearing bracket member comprising a generally inverted U-shaped portion having oppositely extending leg terminal flanges, a base plate underlying said flanges, aligned openings in said base plate and the web portion of said U-shaped bracket member, and a latch rod having a handle portion and a latching arm portion connected together by an angularly related journal portion, said journal portion being rotatably assembled through said aligned openings.

9. In a fender and fender shield assembly, a fender having a wheel access opening, a rub rail mounted on the fender and having an end adjacent to one end of the wheel access opening, a fender shield for closing said opening and providing a continuation of the rub rail over said wheel access opening, means for assembling the fender shield with the fender and rub rail by an endwise movement toward the end of the rub rail, means adjacent to the opposite end of the fender shield for attaching the fender shield by a downward movement into engagement with the fender, and a latch at the lower portion of the fender shield at said opposite end engageable with cooperating means on the fender to draw the fender shield inwardly and downwardly into snug engagement with the fender.

10. In a fender and fender shield assembly and means for attaching the fender shield to the fender in aligned relation to a rub rail, a fender shield panel in upright relation and having an end portion overlapping the fender, the shield panel having an angular flange at said end directed toward the fender, a thin panel bracket attachable to the fender flat thereagainst so as to fit in small clearance behind the rub rail, said panel bracket having a tongue projecting as an extension from one edge of the bracket panel and offset into spaced relation to the fender, said tongue being of substantially greater width than thickness, said fender shield flange having a slot therein elongated in up and down direction, and said tongue being disposed with its width up and down complementary to said slot and engageable in fender shield supporting relation within said slot, whereby said end portion of the fender shield is supported on the upper edge of said tongue.

References Cited in the file of this patent

UNITED STATES PATENTS

| Number | Name | Date |
|---|---|---|
| 2,186,505 | Tibbetts | Jan. 9, 1940 |
| 2,272,680 | Schatzman | Feb. 10, 1942 |
| 2,277,488 | Haltenberger | Mar. 24, 1942 |
| 2,312,052 | Premo | Feb. 23, 1943 |
| 2,352,421 | Wohlfield | June 27, 1944 |
| 2,460,349 | Hessler | Feb. 1, 1949 |